United States Patent
Aysan

(10) Patent No.: US 7,075,933 B2
(45) Date of Patent: Jul. 11, 2006

(54) METHOD AND APPARATUS FOR IMPLEMENTING HUB-AND-SPOKE TOPOLOGY VIRTUAL PRIVATE NETWORKS

(75) Inventor: Can Aysan, Nepean (CA)

(73) Assignee: Nortel Networks, Ltd., St. Laurent (CA)

( * ) Notice: Subject to any disclaimer, the term of this patent is extended or adjusted under 35 U.S.C. 154(b) by 0 days.

(21) Appl. No.: 10/746,472

(22) Filed: Dec. 23, 2003

(65) Prior Publication Data

US 2005/0025069 A1    Feb. 3, 2005

Related U.S. Application Data

(60) Provisional application No. 60/491,865, filed on Aug. 1, 2003.

(51) Int. Cl.
*H04L 12/28* (2006.01)

(52) U.S. Cl. .................................. 370/395.31; 370/401

(58) Field of Classification Search ................ 370/254, 370/351, 395.31, 401; 709/201, 203, 238–242
See application file for complete search history.

(56) References Cited

U.S. PATENT DOCUMENTS

| | | | |
|---|---|---|---|
| 6,205,488 B1* | 3/2001 | Casey et al. ................. | 709/238 |
| 6,693,878 B1* | 2/2004 | Daruwalla et al. .......... | 370/235 |
| 6,778,498 B1* | 8/2004 | McDysan .................... | 370/231 |
| 2002/0037010 A1* | 3/2002 | Yamauchi .............. | 370/395.53 |
| 2003/0108051 A1* | 6/2003 | Bryden et al. ......... | 370/395.54 |
| 2003/0223406 A1* | 12/2003 | Balay et al. ................. | 370/352 |

OTHER PUBLICATIONS

Rosen et al, BGP/MPLS VPNs, RFC 2547 pp. 1-25, Mar. 1999.*
Bates et al, BGP Route Reflection An alternative to full mesh IBGP, RFC 1966, pp. 1-7, Jun. 1996.*
Semeria, RFC 2547bis: BGP/MPLS VPN Fundamentals, Whitepaper, Juniper Networks, pp. 1-38, 2001.*
Cisco Designing MPLS Extension for Customer Edge Router, Product Bulletin, No. 1575, pp. 1-23, 2001.*

(Continued)

*Primary Examiner*—Frank Duong
(74) *Attorney, Agent, or Firm*—John C. Gorecki

(57) ABSTRACT

Deployment of a hub-and-spoke (HaSP) topology virtual private network (VPN) may be facilitated by implementing a bi-directional VRF on a hub PE and using the hub PE as a hub-reflector. Route distinguishers and route targets may be used to differentiate traffic originating on the spokes from traffic originating on the hub. Using a bi-directional VRF allows a HaSP VPN to be created using a single link between the hub CE and hub PE. Allowing the hub CE to control spoke route distribution, and differentiating the direction of the flow by route target and route designator, enables the hub to control traffic between the spokes. Configuring the hub PE as a route reflector allows communication between the spokes to take place without having the CE hub inspect every piece of traffic. Optionally, other services may be provided by the hub PE as well, such as NAT, firewall, and AAA services.

20 Claims, 6 Drawing Sheets

OTHER PUBLICATIONS

Repiquet, Keep it Simple with BGP/MPLS Virtual Private Networks, White Paper, downloadable at www.lambdanet.net, pp. 1-20, May 2002.*

International Search Report from International Application No. PCT/US04/23408 dated Sep. 23, 2005.

Semeria, RFC 2547bis: BGP/MPLS VPN Fundamentals, Juniper Networks, pp. 1-038, 2001.

Cisco, Designing MPLS Extensions for Customer Edge Router, Product Bulletin, No. 1575, pp. 1-23, 2001.

E. Rosen, et al., *BGP/MPLS VPNs*, IETF RFC 2547, Mar. 1999.

*MPLS VPN: VRF Selection Based on Source IP Address*, Sep. 2003.

* cited by examiner

METHOD AND APPARATUS FOR IMPLEMENTING HUB-AND-SPOKE TOPOLOGY VIRTUAL PRIVATE NETWORKS

BACKGROUND OF THE INVENTION

1. Field of the Invention

The present invention relates to communication networks and, more particularly, to a method and apparatus for implementing hub-and-spoke topology virtual private networks.

2. Description of the Related Art

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as data frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements.

A Virtual Private Network (VPN) may be formed by securing communications between two or more networks or network elements to form a VPN tunnel, such as by encrypting or encapsulating transmissions between the networks or network elements. Using VPN tunnels enables information to be exchanged securely between geographically dispersed sites without obtaining dedicated resources through the network.

To enable devices on one VPN site to communicate with devices on another VPN site via the VPN tunnel, it is necessary to exchange routing information between the two VPN sites. Likewise, as network elements are added and removed from the networks, or as problems are encountered and fixed in the networks, the routing tables need to be updated and advertised to the other participating sites in the VPN.

There are several commonly utilized methods of establishing VPN tunnels on a network. For example, VPNs may be established by customers through the deployment of network elements configured with VPN software. These VPNs will be referred to herein as Customer Premise Equipment-based (CPE-based) VPNs. Another way of establishing VPNs is to configure the VPN at the Provider Edge (PE) network elements to allow the service provider to provision VPN services on behalf of the customer. One common way to do this is described in Internet Engineering Task Force (IETF) Request For Comments (RFC) 2547, the content of which is hereby incorporated herein by reference. RFC 2547 describes a VPN architecture in which MultiProtocol Label Switching (MPLS)-based tunnels are used to forward packets over the network backbone. A protocol referred to as Border Gateway Protocol (BGP) is used to distribute routes over the backbone for VPNs provisioned through a particular PE network element. Routing information for these Provider-Provisioned VPNS is stored in a VPN routing and forwarding table (VRF) or a distinguishable area of the PE's common VRF. VPNs established utilizing the 2547 VPN model will be referred to herein as "VRF-based VPNs."

VRF-based VPNs may be designed to have having many different access topologies. One popular topology is commonly referred to as a "Hub and Spoke" topology. In a hub and spoke topology, the hub controls communications on the VPN such that all spokes can talk to the hub. In a "strict" hub and spoke topology, the spokes are only allowed to talk to the hub. In a "loose" hub and spoke topology, spokes are allowed to talk to each other as well, but may only do so through the hub. This allows the hub to control communication between the spokes.

FIG. 1 illustrates a conventional Hub-and-Spoke (HaSP) VPN topology formed using VRF-based VPNs. As shown in FIG. 1, the VPN service provider provides interconnectivity amongst Customer Edge (CE) network elements 10. A CE device 10 is a device which resides in a VPN site 12 and connects to a Provider Edge node 14. Essentially, a CE device allows the VPN site access to one or more remote VPN sites which belong to the same VPN. A Provider Edge (PE) node is a router which attaches to one or more CE devices and peers using Interior BGP (IBGP) with at least one other PE node. The PE node allows remote access to other VPNs which are locally supported by this PE. When handling Internet Protocol (IP) traffic, a PE node acts as a Label Edge Router which terminates Label Switched Path (LSP) tunnels used to forward traffic to other PE nodes. PE nodes may be directly connected to other PE nodes, or may be connected through other network elements such as backbone routers 16. Backbone routers are commonly designated in the industry by the letter P. The provider "P" router is a backbone router which provides interior gateway protocol connectivity between PE nodes. P routers are generally not connected to CE devices and thus have no need for knowledge of VPN routing information. It may be possible for a given router to act as a PE node for some VPNs and as a P router for other VPNs. The following description will focus on how PE nodes behave and assume an appropriate infrastructure for interconnecting the PE nodes. Also, the behavior of the PE nodes will be described in connection with their participation in a VPN network context. The PE nodes may perform other functions on the network as well, even though that other functionality has not been described herein.

In the VPN network of FIG. 1, a VPN customer has two or more sites that need to be interconnected. In some cases the VPN customers own and manage the CE routers. In other cases, the CE routers are owned and managed by the service provider. The invention discussed below is agnostic as to who actually owns the various components of the network, i.e. one or more network providers and customers may own the CE, PE, and P network elements without affecting the aspects of the invention discussed herein.

As mentioned above, in a Hub-and-Spoke (HaSP) topology, a spoke is defined as a site that must direct traffic to a hub site to communicate with another particular spoke such that no direct inter-spoke traffic is allowed. A HaSP topology may, however, be a sub-part of a larger VPN network topology, and the spokes optionally may be allowed to talk to other portions of the VPN topology directly. Thus, a spoke may be allowed to communicate with other VPN sites not part of the HaSP topology.

Within the HaSP portion of the VPN network, the hub is allowed to receive and send traffic to the spokes of a given VPN. Inter-spoke traffic, however, must goes through a hub to be validated prior to being sent to the target spoke. For example, in the HaSP topology illustrated in FIG. 1, traffic from site 2 to site 3 would follow the path: CE2→PE2→PE1→CE1(hub) →PE1→PE3→CE3. The CE1 or a device behind it is assumed to validate the source and destination site communication privileges using a Network Address Translation (NAT) service, a Fire Wall, an Authentication, Authorization, and Accounting (AAA) service and/or another service.

In HaSP topologies, service providers conventionally create a minimum of two sub-connections between the hub CE and the PE. In FIG. 1, these two connections are designated as connection A and connection B. One of the connections (A) is configured to carry traffic from the source spoke sites toward the hub CE and the other connection (B) is configured to carry traffic from the hub CE toward the destination spoke sites. Each interface on the router associated with these connections (e.g. the interface to link A and the interface to link B) has its own VRF forwarding table. The reason behind this is that a packet destined for CE3 must be treated differently by the PE1 network element depending on where the packet originated. Specifically, if the packet originated at CE2 or another spoke, the packet must be sent to CE1(hub) to be evaluated. If the packet originated at CE1(hub), however, the PE needs to send it to the CE3 network element. The destination address (DA) of each packet, however, is the same in both instances, i.e., the packet is addressed to the DA of CE3. To enable the PE network element to provide differential service to packets having identical DAs based on source of origin, two separate VRFs have conventionally been used—one to handle traffic that is received from the spokes and one for traffic that is received from the hub.

FIG. 2 illustrates a conventional manner of distributing routes in a conventional Hub-and-Spoke (HaSP) network topology. As shown in FIG. 2, when a route R2 is learned by VRF2 on PE2, that route will be distributed throughout the MultiProtocol Label Switching (MPLS) or other domain using Border Gateway Protocol (BGP) in a standard fashion. Although an example using MPLS and BGP will be used to illustrate embodiments of the invention, the invention is not limited to an MPLS/BGP example. Specifically, the route R2 will be exported to PE1 as per VRF2's export policy. In a standard implementation, VRF2 will have an export policy configured to export routes with route targets set to "spoke" and an import policy configured to import routes with route targets set to "hub." This will be noted herein as Export RT:spoke and Import RT:hub. These policy rules cause the spoke PEs to import routes with route targets set to hub, but not to import routes having one of the spokes as a route target. This prevents spokes from communicating directly with each other and allows the hub to control communication between the spokes.

The learned route, R2, will be distributed throughout the BGP domain and will, thus, be distributed to PE1. The PE1 has two VRFs, one for each link A, B. The inbound VRF, that is configured to handle traffic originating on the spokes and destined for the CE1hub, is set to Import RT:spoke and Export RT:none. This enables the VRFhub-1 to import routes from the spokes but prevents that VRF from exporting those routes to the spokes. The routes, in this case the new route R2, are redistributed to the CE1hub as per VRFhub-1's import policy and other routing policies related to routing between CE1hub and VRFhub-1.

CE1hub is charged with allowing or disallowing relationships. For various reasons, the CE1hub may wish to restrict the ability of the spokes to communicate with each other over particular routes. For example, one of the spokes may relate to a corporation's customer or supplier, and another of the spokes may relate to a branch office. The corporation may not wish the customer/supplier to have access to all of the traffic flowing between the corporation and the branch office. Accordingly, the hub may wish to restrict distribution of routes learned by a spoke to one or more other spokes.

If route R2 is to be distributed to one or more spokes, the VRFhub-2 learns R2 as a local route from CE1hub. VRFhub-2 has an import policy set to import RT:none to prevent it from importing routes advertised on the IP VPN. The import policy is configured, however, to accept routes sent to it from the CE1hub. The export policy for VRFhub2 is configured to export routes provided to it by the hub. In this case, VRFhub2 has a policy Export RT:hub. If approved, R2 is thus exported on the IP VPN with its route designator, also known as the IP-next hop,=hub2, and its route target=hub.

PE devices configured with an import policy Import RT:hub will import the route. PE3, thus, learns route R2 but associates the route target on R2 with the hub and the route designator on route R2 with VRF hub 2. PE2 originated the route R2, so it will already have route R2 in its VRF and will ignore the protocol message containing the route R2 to prevent the formation of a routing loop. The BGP next-hop attribute will be set by the PE and P routers to establish a LSP for the route R2.

Subsequently, if the CE3 has traffic to be sent to the network element associated with R2, it will send the traffic to its connected PE, in this example PE3. PE3 will then obtain the next hop information for the route R2 from VRF3, which will be used to forward the packets toward the PE1 hub. The packets will be sent to the CE1hub for inspection and, if approved, will be passed down the other spoke toward CE2.

Unfortunately, this implementation of a HaSP VPN network topology thus requires the PE hub network elements to create and maintain two VRF forwarding tables—one for each interface that is used to connect to the CE1hub. This increases the cost of providing VPN service for the service provider. Additionally, the customer must purchase connectivity on two separate links, each of which will typically require a service level agreement (SLA). Since most SLAs specify bandwidth in both directions, using one link to transport packets from the PE to the hub and another to transport packets from the hub to the PE results in a waste of network resources. This situation is exacerbated where the connection between the CE-hub and PE network is a multihoming connection, in which redundancy is provided either through the use of multiple CE hubs, multiple PE nodes, multiple links connecting the hubs to the PE nodes, multiple protocol connections, or combinations of these redundancy components.

SUMMARY OF THE INVENTION

The present invention overcomes these and other drawbacks by providing a method and apparatus for facilitating deployment of hub-and-spoke topology virtual private networks. According to one embodiment of the invention, the PE is used as a reflector with a bi-directional VRF to enable directional routes to be used in one database. In one embodiment, route distinguishers and route targets are used to differentiate traffic originating on the spokes from traffic originating on the hub. The PE1 hub in this embodiment is configured as a hub reflector and disseminates the route information designating the hub reflector as the route target. The other PE nodes will input the route information and direct all traffic on the route to the hub reflector. The hub reflector will reflect the traffic to the other spoke(s). According to this embodiment of the invention, the directional VRF enables a hub and spoke VPN topology to be created using a single link between the CEhub and PEhub, thus reducing costs associated with this topology. Additionally, by using the PE1 as a hub reflector, traffic between the spokes will not be affected if the CE1 hub or the link to the CE1 hub is down. Enabling the CE1 hub to instruct the route reflector as to which routes are to be reflected/exported enables the CE1 hub to maintain control over connectivity between the spokes. Optionally, other services may be provided by the PE1 hub as well, such as NAT, firewall, and AAA services.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As discussed in greater detail below, aspects of the present invention relate to a method and apparatus for implementing hub-and-spoke virtual private networks. According to one embodiment of the invention, the PE is used as a reflector with a bi-directional VRF to enable directional routes to be used in one database. In one embodiment, route distinguishers and route targets are used to differentiate traffic originating on the spokes from traffic originating on the hub. The PE1 hub in this embodiment is configured as a hub reflector and disseminates the route information designating the hub reflector as the route target. The other PE nodes will input the route information and direct all traffic on the route to the hub reflector. The hub reflector will reflect the traffic to the other spoke(s). According to this embodiment of the invention, the directional VRF enables a hub and spoke VPN topology to be created using a single link between the CEhub and PEhub, thus reducing costs associated with this topology. Additionally, by using the PE1 as a hub reflector, traffic between the spokes will not be affected if the CE1 hub or the link to the CE1 hub is down. Enabling the CE1 hub to instruct the route reflector as to which routes are to be reflected/exported enables the CE1 hub to maintain control over connectivity between the spokes. Optionally, other services may be provided by the PE1 hub as well, such as NAT, firewall, and AAA services.

While this invention will be described as using VRF-based VPNs, it should be apparent that the invention is not limited to VRF-based VPNs, but rather extends to other types of virtual circuits formed over any type of communications network. Likewise, while three PE network elements are illustrated in the example network as being interconnected via three VPN tunnels, the invention is not limited to a network of this topography, as any number of PE network elements and VPN tunnels may be employed.

Figure 3:
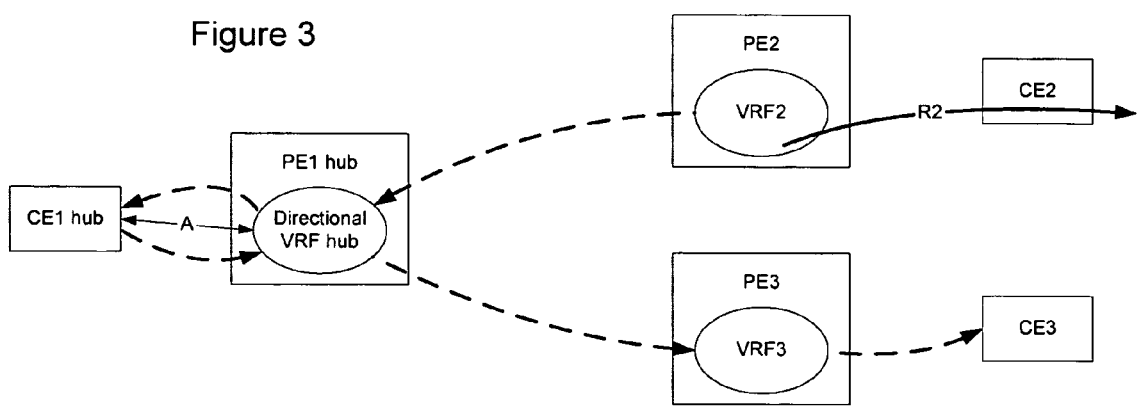
FIG. 3 is a functional block diagram illustrating the flow of routing information in a HaSP network topology according to an embodiment of the invention.

FIG. 3 illustrates the flow of routing information in a hub-and-spoke (HaSP) VPN network topology according to an embodiment of the invention. As shown in FIG. 3, according to an embodiment of the invention, one or more directional VRFs may be used to connect a CE hub with an associated PE device in a HaSP VPN network. There are many ways of configuring the interconnection between a VPN site and a VPN network, as discussed below in greater detail in connection with FIGS. 4–13. The embodiment illustrated in FIG. 3 is thus merely one example of how the invention may be implemented and is not meant to limit the scope of the invention.

In the embodiment illustrated in FIG. 3, a single link is used to connect a single CE on a hub VPN site to a single PE on the VPN network to facilitate communication with two or more spoke VPN sites. As shown in FIG. 3, the PE1hub node contains a directional VRF hub for use by the VPN. The PE1 hub node in this instance is configured to operate as a VPN hub reflector as discussed in greater detail below. There are two aspects to understanding the operation of the embodiment illustrated in FIG. 3: (1) the exchange of routing information between VPN sites; and (2) the use of the routing information to tunnel traffic between the sites. In the following description it will be assumed that the PE nodes are interoperating using MPLS and that routing information will be exchanged between the PE nodes using BGP. While these protocols will be used to explain an implementation of the invention according to one embodiment, the invention is not limited to the use of these particular protocols but rather extends to the use of other conventional and to-be-developed protocols that implement the features of the invention. Accordingly, the invention is not to be construed as being limited to an MPLS/BGP implementation.

EXCHANGE OF ROUTING INFORMATION

As described in greater detail below, routes learned by one of the PE nodes on a spoke are advertised to the other PE nodes. In the implementation illustrated in FIG. 3, the only PE node with a VRF having an input policy appropriate to input the route information is the PE1hub. The other PE nodes are not configured to input the route information because inter-spoke communication is not allowed. Routes received by the PE1 hub are sent to the CE1 hub for evaluation. If the CE1 hub decides that the routes are to be disseminated to one or more of the spokes, the CE1 hub passes the route to the PE1 hub. The PE1 hub in this embodiment is configured as a hub reflector and disseminates the route information designating the hub reflector as the route target. The other PE nodes will input the route information and direct all packets on the route to the hub reflector. The hub reflector will reflect the packets to the other spoke without requiring the packets to pass through the CE1 hub network element. This is advantageous in that if the CE1 hub or the link to the CE1 hub is down, spokes can still communicate with each other over established routes. Enabling the CE1 hub to instruct the route reflector as to which routes are to be reflected/exported enables the CE1 hub to maintain control over connectivity between the hubs. Optionally, other services may be provided by the PE1 hub as well, such as NAT, firewall, and AAA services.

An example may help explain some of the details associated with one implementation of this embodiment of the invention. Assume, in this example, that VRF2 has learned a new local route R2. VRF2 will export the new local route R2 according to its export policy, which in this example is Export RT: spoke. By setting the export policy to spoke, all routes with a route target set to spoke will be advertised to enable other PE network elements, such as the PE1 hub, to be notified about the route through that spoke. As used herein the designation "spoke," "hub," "hub reflect," and other similar notations may be any conventional piece of information, such as an Internet Protocol (IP) address and the invention is not limited to any particular manner of actually designating a route as spoke or hub.

The hub PE node has an import policy set equal to spoke Import RT: Spoke, since the PE1 hub VRF (VRF-hub) is interested in learning all routes through all spokes. None of the other spokes, however, should have an import policy set to import routes with route targets set to spoke, unless those spokes are to be allowed to import routes relating to other spokes directly and without the control of the hub. The invention is not limited to a topology that excludes all spokes from importing routes with route targets set to spoke. In the following description it will be assumed that this is not the case, however, and that the CE1 hub wishes to have control over which spokes are able to communicate with each other. It is noted that the HaSP network topology may be a sub-set of a broader VPN network topology and that this HaSP network topology may only relate to a particular region of an overall network topology.

Routes imported to the VRF-hub are communicated to the CE1 hub. Specifically, the VRF-hub core facing Forwarding Information Base (FIB) is programmed such that all user traffic from spokes will be redirected to CEhub with the exception of VRFhub terminating traffic.

If the CE1 hub determines that R2 is to be redistributed to one or more of the other spokes, the CE1 hub sends the route to PE1 to be included in the VRF-hub. PE1 hub will export the route per its export policy. Since the other PEs are configured to not import routes with a route target=spoke, the VRF-hub will set route R2 with a route designator=hub, and a route target=hub-reflect. The next hop attribute for the route will be set to PE1 hub when the route update is issued by the PE1. The next hop attribute may be changed by the P and PE routers as it traverses the MPLS network in a conventional fashion. The route R2 will also include an interface designator I/F=A. Information associated with I/F A is stored locally by the PE1 and not shared between PEs, to enable PE1 to re-direct traffic from the spokes to CE1 through I/F A In this manner, PE1 hub advertises that route R2 is reachable through PE1 hub, so that traffic intended for route R2 will be passed to PE1 hub. By setting the I/F to A, the PE1 hub will be able to discern which CE1 hub is associated with the traffic to discern between VPNs where more than one VPN is being handled by the same PE.

PE3 is configured to import routes with a route target=hub-reflect. Thus, PE3 has an import policy Import RT:hub-reflect. Accordingly, PE3 and any other PEs on the VPN network, will import the route R2 into their VRF. PE2, as the originator of the route R2, may choose not to import the route as it already has the route in its VRF and updating the route R2 with the new route could cause a routing loop.

In operation, traffic intended to be passed over the VPN network to the CE associated with route R2 will be forwarded according to the routes contained in the VRFs of the PE network elements. Accordingly, a packet received by PE2 and intended to be passed along route R2 will be forwarded by PE2 to CE2. A packet generated or handled by CE3 will be passed to PE3. PE3 will identify the packet as belonging to a particular VPN and will access the VRF for that VPN, or will access the portion of a VRF allocated to that VPN. In this example, the VRF is VRF3. The PE3 will index into the VRF to obtain routing information for route R2 and will obtain the next hop attribute and/or MPLS label for the packet. The PE3 will encapsulate the packet with an MPLS label and forward the packet to the next hop designated in the VRF. Where there are no intermediate P network elements, the next hop attribute will indicate PE1 as the next hop for that packet. Where there are intermediate P network elements, the next hop attribute of the MPLS label will indicate the next successive P network element to which the MPLS-wrapped IP packet should be sent.

The PE3 router thus acts as a Label Edge Router (LER) for packets designated to be sent out over the MPLS domain. The packet will be sent over a Label Switched Path (LSP) from the PE3 to the PE1 node. Since the Route Target is "hub-reflect" the packets will be handled by the PE1 hub as a hub reflector. The hub reflector will recognize the packet as belonging to route R2 and will reflect the packet to the PE2 network element by attaching an appropriate label obtained from the PE1's VRF hub. The PE1 thus acts as a destination LER for packets arriving on a first LSP from PE3 and acts as an originating LER for packets to be sent to PE2. The packets are then transmitted to PE2 which unencapsulates the packets by removing the MPLS header. The PE2 transmits the packets to CE2 which transmits the packets along route R2 in a conventional fashion.

Accordingly, as discussed above, by using the PE1 hub network element as a route reflector, it is possible to use a single link between the PE1 hub and CE1 hub to handle HaSP VPN network architectures. Thus, fewer links are required to implement the HaSP network architecture thus reducing costs for the customers. Additionally, a single VRF is able to be used to handle route distribution and packet redirection, thus reducing operational overhead expenses for the VPN service provider. Moreover, packets to be handled by the VPN do not need to be transmitted to the CE1 hub network element. Thus, transmissions between spokes can occur where the CE1 hub or one or more links between the CE1 hub and PE1 hub are not functional.

In the above description, it has been assumed that the route information was for a single route. The same methods may be used to distribute route groups as well. Specifically, assume that CE2 and hence PE2 belong to a particular spoke group, designated for purposes of this explanation as spoke-group 1. In this instance, VRF2 will have import and export policies set to Export RT:spoke-group 1; Import RT:hub reflect. Accordingly, VRF2 will be configured to export all routes related to spoke-group 1 and to import routes with a route target hub-reflect. The VRF hub will import all routes with route targets for any spoke, and will pass the route information to the CE hub in the same manner as discussed above. If approved by the CE hub, the route will be redistributed by the VRF hub to the spoke PEs. In this instance, the route distinguisher will be set to hub, the Route target will be set to hub-reflect-group 1, and the next hop attribute will be set (initially) to PE1. As before, the interface designator will be set to A. The interface designator will be described in greater detail below in connection with redundancy scenarios in which multiple CEs on a given VPN site attach to the same PE. In this instance, the interface designator may enable the VRF to distinguish which CE should be burdened with which spoke traffic, which may provide for load balancing, etc., as described in greater detail below. Since there is only one CE in this example, the interface designator designates the interface through which the CE hub may be reached.

PE 3, if it is part of the spoke group, will have its VRF policies set to export route targets for the spoke group and to import route targets identifying the hub-reflect. Specifically, the policies on PE3 may be set to: Export RT:spoke-group 1; Import RT:hub-reflect. By using spoke groups it is possible to partition the spokes into different sub-VPNs such that all spokes within a group are able to exchange route information and spokes outside the group are not able to obtain route information for the group. This makes it easy to partition the spokes into logical groups. Also, spokes may be moved from one group to another simply by adding another spoke member to the group, which allows the network topology to be modified simply and efficiently.

In the current implementation of the VRF-based VPN model, routing information is transmitted between PE network elements using MultiProtocol Border Gateway Protocol (MP-BGP). MP-BGP enables BGP to carry routing information for multiple network layer routing protocols, e.g. IPv6, IPX, VPN-IPv4, and other similar protocols. The invention is not limited to this embodiment, but rather extends to all routing protocols that may be used to exchange routing information between PE network elements.

The ideas and concepts associated with the invention may be applied successfully to other manners of interconnecting a VPN site CE(s) and a VPN network PE(s) to provide redundancy in the interconnection of these two networks. Several examples of how redundancy may be provided are illustrated in connection with FIGS. 4–8. As shown in FIGS. 4–8, there are many ways of connecting a VPN site to a provider edge (PE) network element. The invention is not limited to these several examples.

Figure 4:
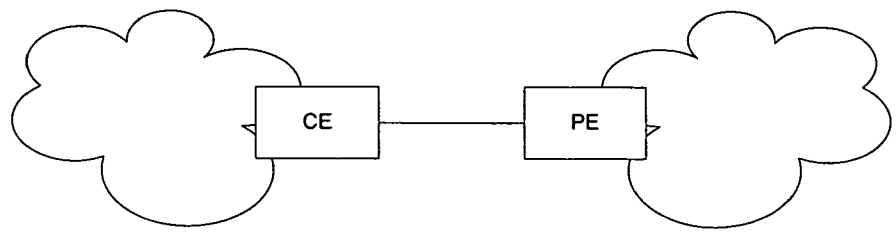
FIGS. 4–8 are functional block diagrams illustrating several possible CE-PE connections in a HaSP network topology according to embodiments of the invention.

FIG. 4 illustrates the example provided above with respect to FIG. 3 in which a single CE on a VPN site is connected to a single PE on the provider network. This is the simplest form of connectivity, but provides no redundancy. Thus, a failure on the link between the CE and PE, a failure of the CE, or a failure of the PE, will cause network connectivity between the hub and the spokes to be lost.

Figure 1:
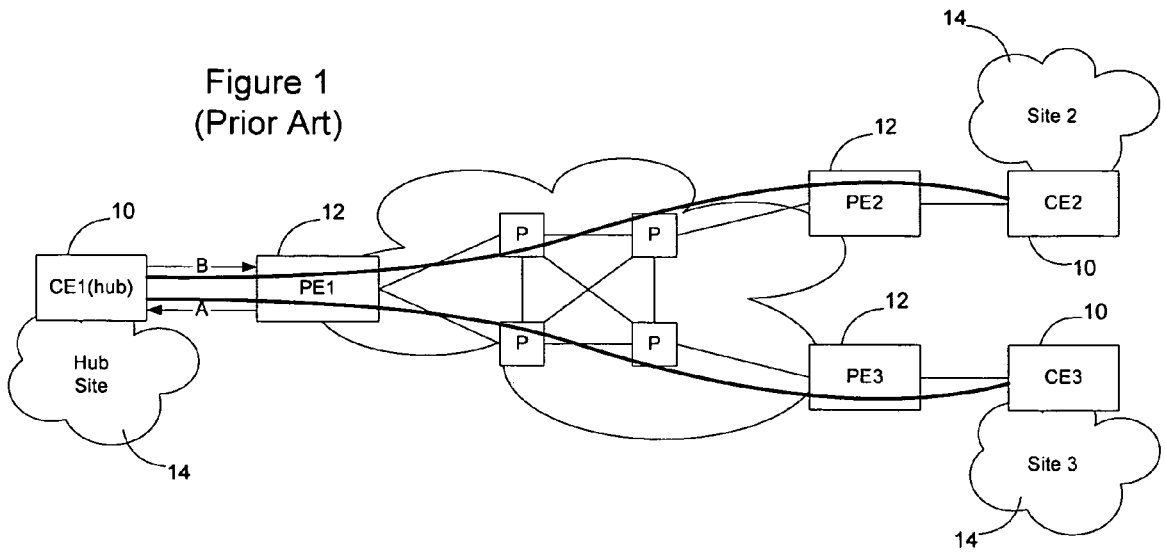
FIG. 1 is a conventional Hub-and-Spoke (HaSP) network topology employing two links (A and B) to connect the CE1hub network element with its associated PE node.
Figure 2:
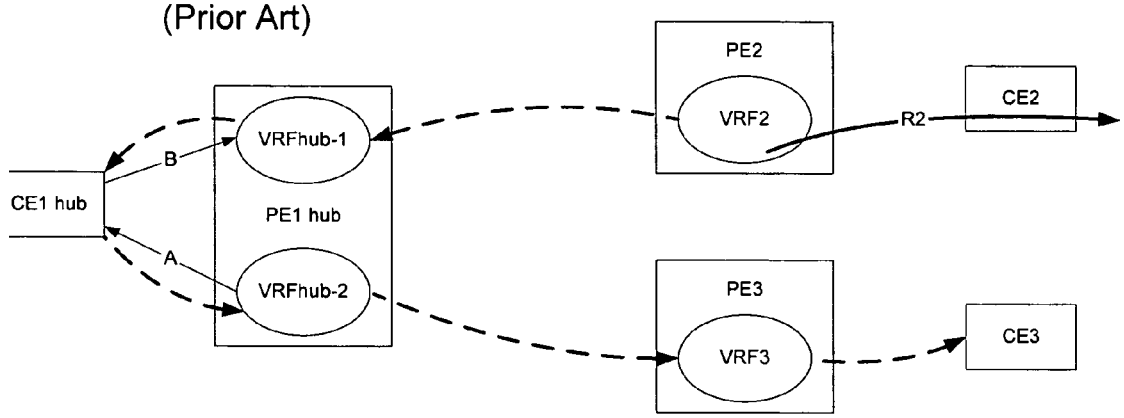
FIG. 2 is a functional block diagram illustrating the flow of routing information in the HaSP network topology of FIG. 1.
Figure 5:
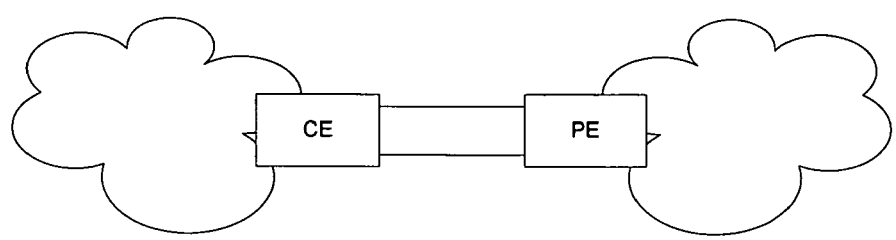

FIG. 5 illustrates an example that provides link redundancy between the CE and PE. In the example of FIG. 5, two links are provided to attach a single CE and a single PE. These links are both bi-directional links, unlike the situation illustrated in FIGS. 1 and 2. In this example, each of the bi-directional links is connected to one or more shared directional VRF(s). The CE may run different routing protocols or different instances of the same routing protocol on each link to the PE. This example provides link redundancy, but does not provide PE or CE redundancy. Thus, a failure of the CE or a failure of the PE will cause network connectivity between the hub and the spokes to be lost. An embodiment of the invention utilizing the example of FIG. 5 to provide interconnection between the VPN site and the provider network will be discussed below in greater detail in connection with FIG. 9.

Figure 6:
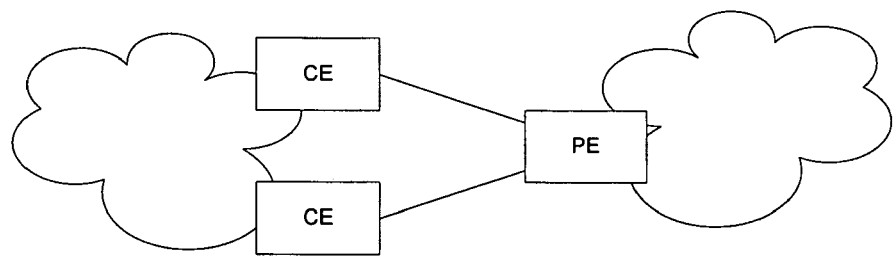

FIG. 6 illustrates another example of interconnecting a VPN site and a provider network. In this example, two or more CE hub network elements are connected to a single PE node over two links. This provides CE and link redundancy, but does not provide PE redundancy. An embodiment of the invention utilizing the example of FIG. 6 to provide interconnection between the VPN site and the provider network will be discussed below in greater detail in connection with FIG. 10.

Figure 7:
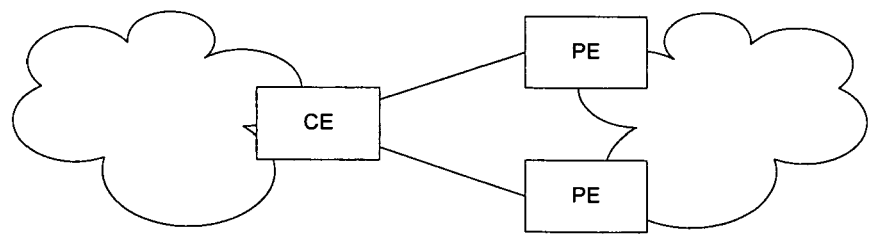

FIG. 7 illustrates another example of interconnecting a VPN site and a provider network. In this example, one CE hub network element is connected to two or more PE nodes. This provides PE and link redundancy, but does not provide CE redundancy. An embodiment of the invention utilizing the example of FIG. 7 to provide interconnection between the VPN site and the provider network will be discussed below in greater detail in connection with FIG. 11.

Figure 8:
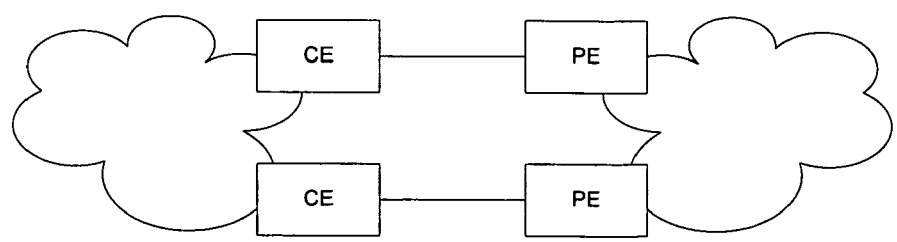

FIG. 8 illustrates another example of interconnecting a VPN site and a provider network. In this example, multiple CEs on the VPN site are connected to multiple PEs on the provider network. In the illustrated embodiment two CEs are connected to two PEs. This example is not limited in this manner, as multiple PEs and multiple CEs may be used to provide the connection between the VPN site and the provider network. This type of connectivity may provide PE redundancy, CE redundancy, and link redundancy. An embodiment of the invention utilizing the example of FIG. 8 to provide interconnection between the VPN site and the provider network will be discussed below in greater detail in connection with FIG. 12.

In these examples, where the hub VPN site is attached to multiple PEs, the PEs should belong to the same autonomous system. As used herein, the term "Multihoming" will be used to refer to a single network (that is a VPN site) having more than one connection to the service provider. The topologies illustrated in FIGS. 5–8 and 9–12 show various ways of Multihoming. One incentive for multihoming is to improve redundancy. Improved redundancy is possible since a multihomed site can allow for a single point of failure without losing connectivity between the VPN site and the service provider's network.

Figure 9:
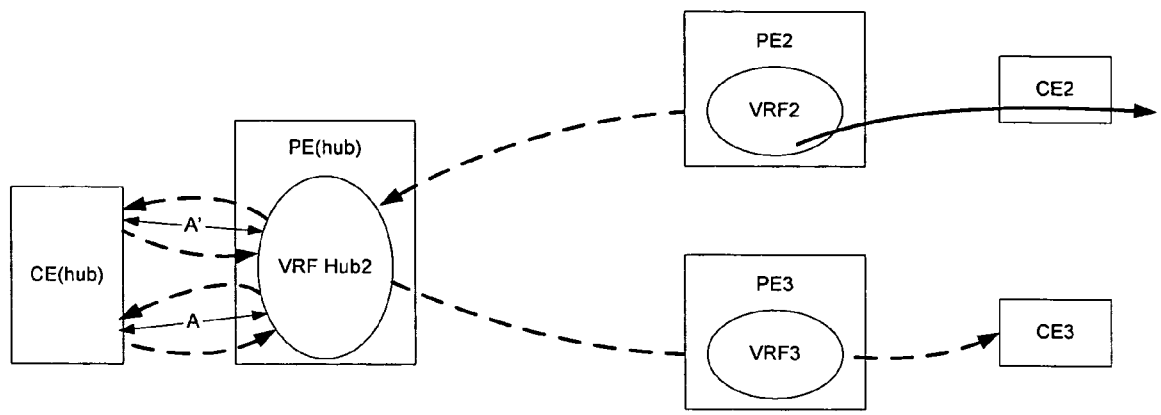
FIGS. 9–12 are functional block diagrams illustrating the flow of routing information in the CE-PE connections of FIGS. 4–8 according to embodiments of the invention.

FIG. 9 illustrates an example of multihoming to improve redundancy between the VPN site and the network provider's network. Specifically, in this example, two links A and A' are used to interconnect the CE hub with the PE hub. A directional VRF hub is used to handle route distribution for the VPN spokes provisioned through the PE hub. Each of the CE-PE connections is configured in the same way as the single CE-PE connection described in greater detail above with respect to FIG. 3. In this example one link, such as link A, would be designated as the primary link and the other link A' would be designated as the backup link. Standard IP routing protocols enable packets to be routed around a link failure and hence allow traffic destined for CE hub to use the backup link in the event of failure of the primary link.

Figure 10:
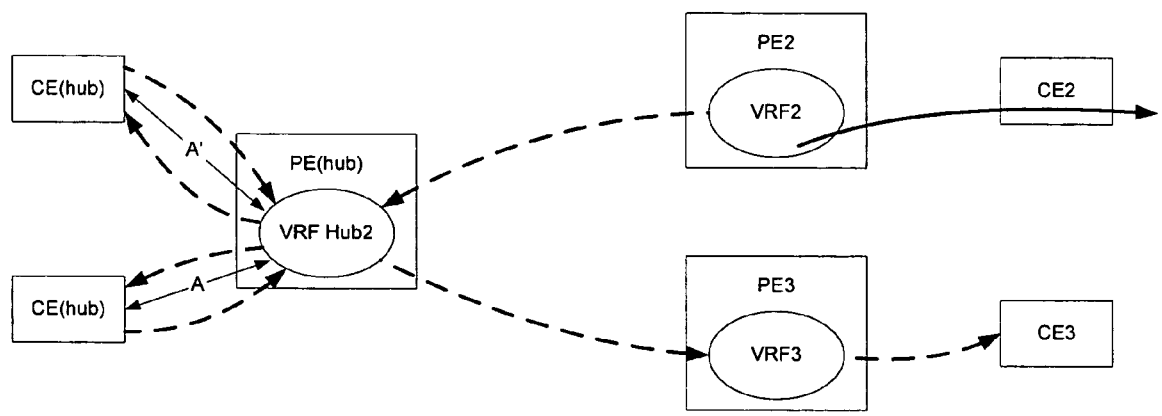

FIG. 10 illustrates an example in which two links A, A' are used to connect the PEhub with two CE hub network elements. The import and export policies on the PE network elements are the same in this instance as discussed above in connection with FIG. 3. The difference is that there are now two different ways for traffic and routes to be passed to the CE hub VPN site. One of the link/CE combinations may be designated as the primary and the other as the default, or both may be used interchangeably. Alternatively, particular routes may include interface designators set to A or A' depending on which device/connection should be used to receive traffic and control traffic on the route. The invention is not limited to the manner in which the multihomed connection is implemented or utilized.

Figure 11:
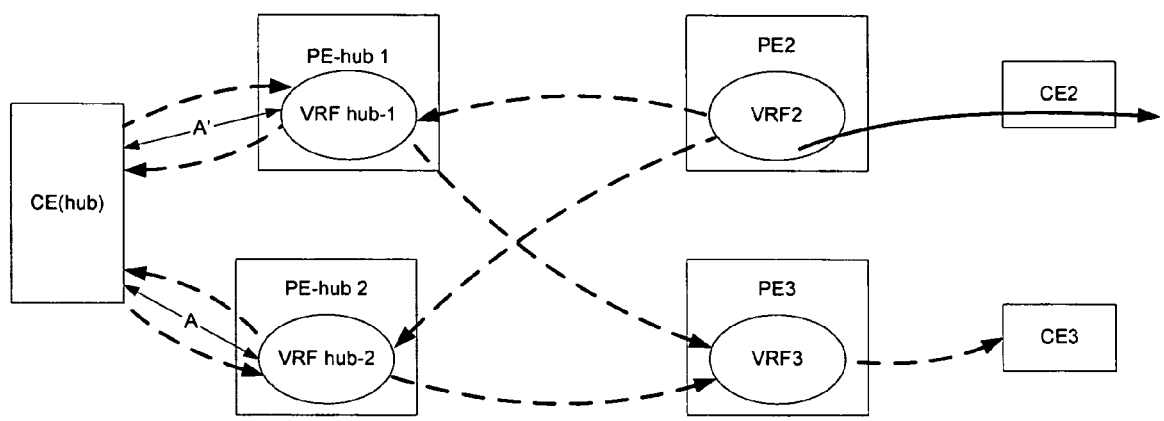
Figure 12:
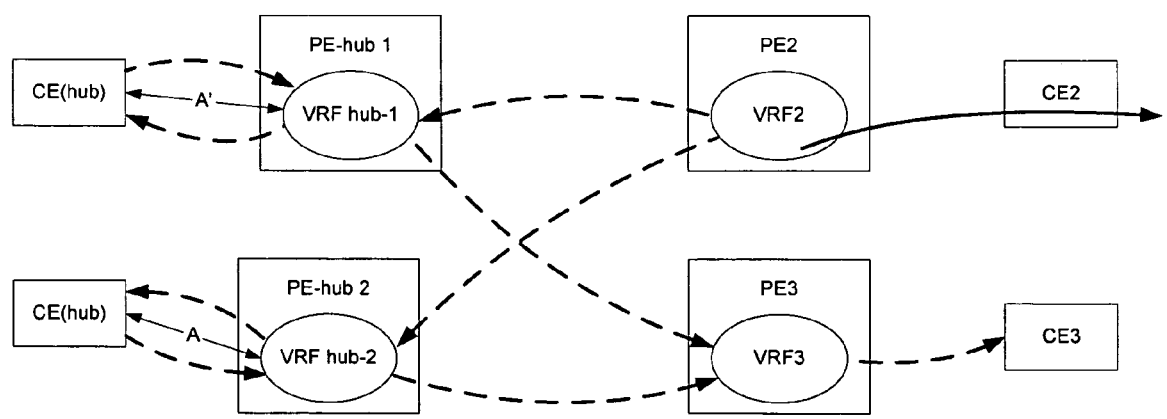

FIGS. 11 and 12 illustrate multihomed embodiments in which two PE hub network elements are used to connect to a given VPN site. In the embodiment of FIG. 11 the two PE hub network elements connect to a single CEhub network element and, in the embodiment of FIG. 12, the two PE hub network elements connect to two CEhub network elements. Since the distribution of routing information will be the same from the PE perspective, these two embodiments will be described together.

When a route R2 is learned at PE2, it will be inserted into PE2's VRF and exported according to VRF2's export policy Export: RT=spoke. This route will be received by the PEs on the network including PE1 hub-1 and PE1 hub-2. This route will then be passed to one or both of the CE hub network elements and, if approved, inserted into the PE1 VRFs. The VRF that has been designated as a primary network element for that route will export the route on the network with its address as the BGP next-hop. Thus, for example, assume that PE-hub 1 will be the BGP next-hop causing corresponding spoke user traffic to be redirected to PE-hub 1. R2 will be exported from PE1VRF-1 and will include PE-hub 1 as the BGP next-hop. PE-hub 1 will function as a route reflector and, for traffic received at PE-hub 1, will reflect the traffic to PE2 with a route target=spoke. Optionally, the non-primary PE network element may also advertise the route with a higher cost to enable it to be used as a backup in the event the primary PE is experiencing failure or otherwise cannot handle the traffic.

Figure 13:
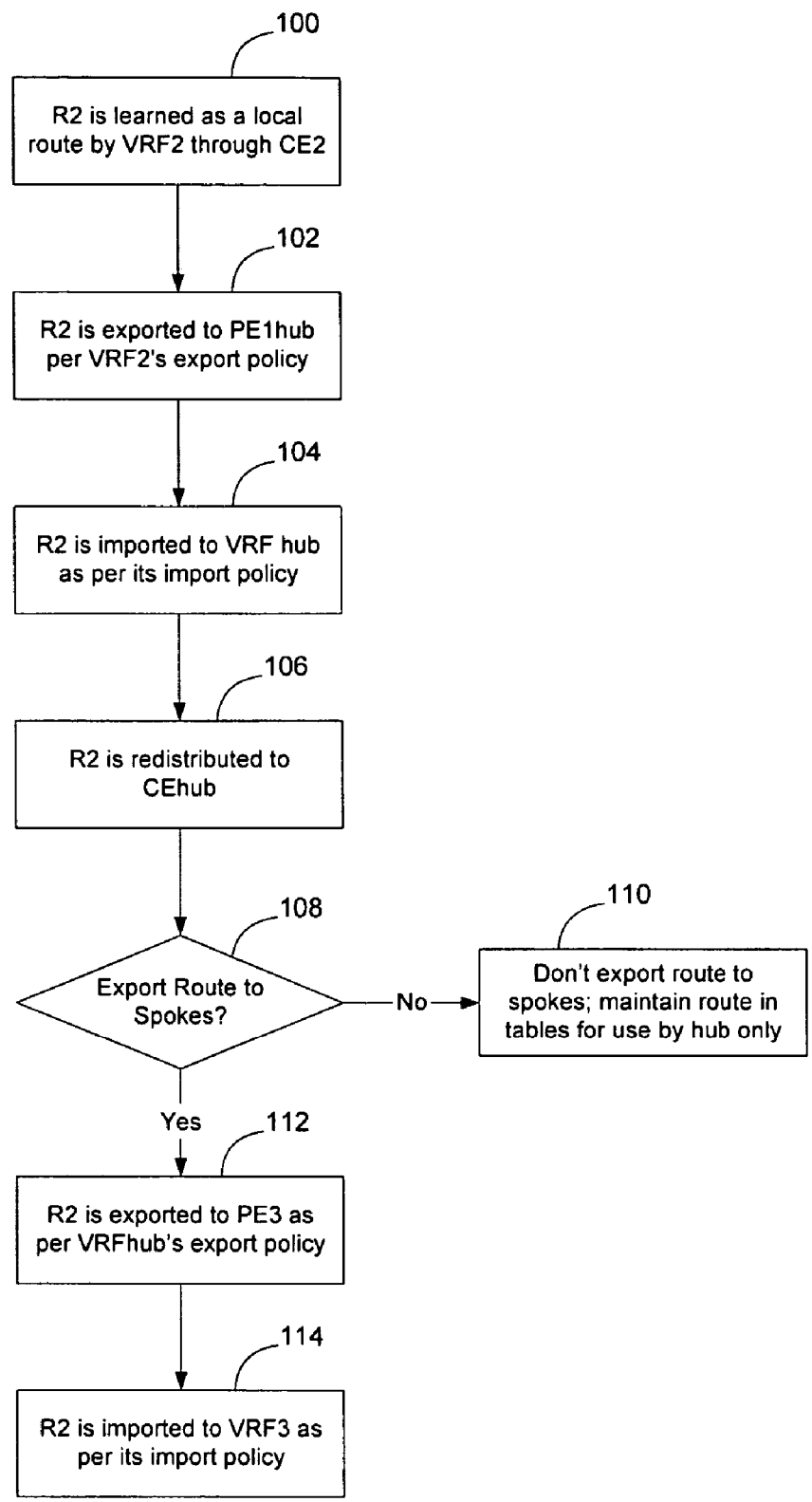
FIG. 13 is a flow diagram illustrating a method of exchanging routing information according to an embodiment of the invention.

FIG. 13 illustrates a method that may be used to implement an embodiment of the invention. The method may be implemented by appropriately programmed computer software, firmware, or specially configured hardware. As shown in FIG. 13, when route R2 is learned as a local route by a VRF through its associated CE network element (100) it is exported to the PE network element(s) connected to the hub (102). The route R2 is imported to the VRF hub according to its import policy (104) and is redistributed to one of the CE hub devices configured to receive new routes (106). The CE hub makes a decision as to whether the route R2 should be expored (108). This decision may be made by the CE hub directly or by interfacing with another network service. Where the route is not to be exported (110) the route is maintained in the table for use by the CE hub. If approved, the route R2 is exported to the other spokes, such as PE3, according to the VRF's export policy (112) where it is imported to the VRFs associated with the spoke PE network elements (114). Numerous other ways of implementing embodiments of the invention may be utilized as well and the invention is not limited to this particular example embodiment.

Figure 14:
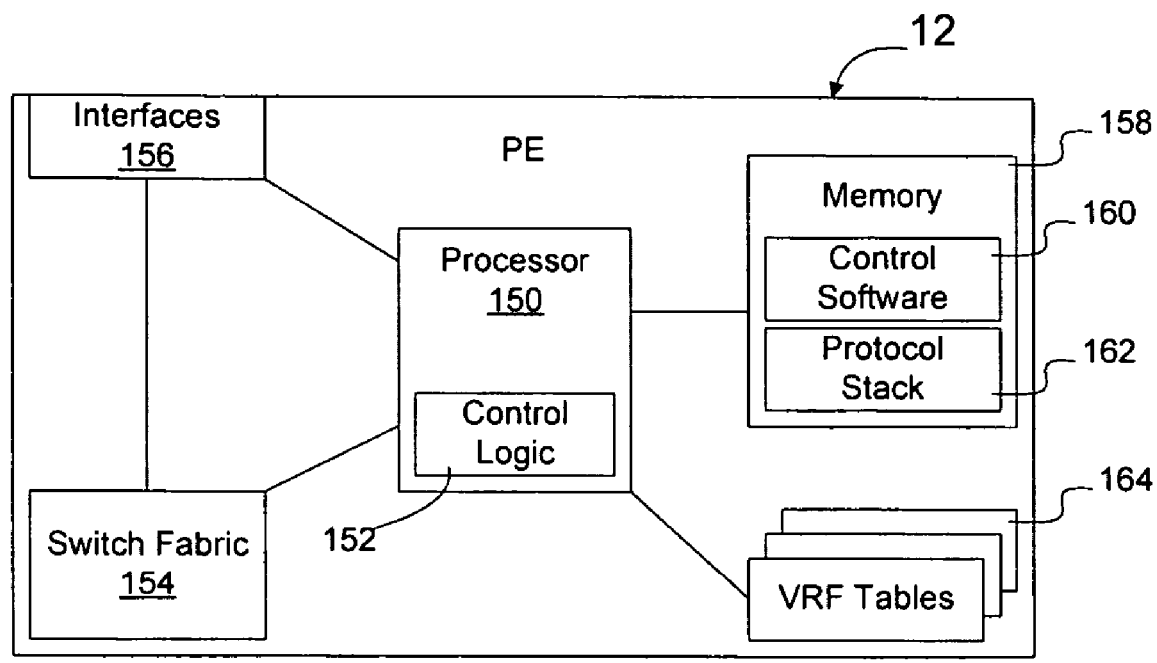
FIG. 14 is a functional block diagram of a PE node configured to implement an embodiment of the invention.

One example of a Provider Edge (PE) network element 12 according to an embodiment of the invention is illustrated in FIG. 14. As shown in FIG. 14, the PE network element 12 in this embodiment includes a processor 150 containing control logic 152 configured to implement the functions ascribed to the PE 12 discussed herein in connection with FIGS. 1–14. The PE 12 may be embodied as a network element including a switch fabric 154 or other hardware, firmware, and/or software, to enable the network element to perform functions commonly ascribed to a router, or switch, or other network element, to enable the network element handle traffic on the VPNs. Network interfaces 156 are provided to enable the network element to receive protocol data units from the communications network and to output protocol data units onto the communications network.

The PE 12 may be a separate device/machine on the network. Alternatively, the PE 12 may be instantiated as a process on another network element. The invention is not limited to any particular implementation on the network.

A memory 158 includes data and instructions to enable the processor to implement the functions ascribed to the PE 12 and the directional VRF(s) described above. The functionality may be defined by control software 160 within the memory 158. A protocol stack 162 may be provided to enable the processor to communicate with other network elements using established protocols. For example, the protocol stack may contain data and instructions to enable it to participate in protocol exchanges according to the MPLS, BGP, IP and many other conventional protocols.

VRF forwarding tables 164 may be contained in memory 158 or, optionally, may be stored in a separate database 164 native to or interfaced to PE 12. The invention is not limited to a particular manner or location for storing the VRF forwarding table(s).

The PE 12 may include additional or alternate components/processes configured to facilitate deployment of the functionality ascribed to it herein. The invention is thus not limited to a PE 12 or a system employing a PE 12 with only the enumerated components discussed herein, but rather extends to any PE 12 performing the functions described herein and as set out in the claims.

The control logic 152 may be implemented as a set of program instructions that are stored in a computer readable memory within the network element and executed on a microprocessor, such as processor 150. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that all functional statements made herein describing the functions to be performed by the methods of the invention may be performed by software programs implemented utilizing subroutines and other programming techniques known to those of ordinary skill in the art.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A BGP/MPLS-based hub and spoke Virtual Private Network (VPN) topology, comprising:
   a first hub Provider Edge (PE) network element;
   a plurality of spoke PE network elements; and
   a first directional VPN Routing and Forwarding (VRF) table associated with the first hub PE network element and configured to enable the first hub PE network element to route traffic that arrives over a network backbone from the spoke PE network elements differently than traffic that arrives from an attached hub Customer Edge (CE) network element.

2. The hub and spoke VPN topology of claim 1, wherein the first directional VRF forwarding table is maintained at the first hub PE network element.

3. The hub and spoke VPN topology of claim 1, further comprising a first hub Customer Edge (CE) network element configured to interface with the first hub PE network element over a first single bi-directional communication link.

4. The hub and spoke VPN topology of claim 3, wherein the first directional VRF forwarding table is configured to control traffic on the first single bi-directional communications link.

5. The hub and spoke VPN topology of claim 3, wherein the first CE network element is further configured to interface with the first hub network element over a second single bi-directional communication link.

6. The hub and spoke VPN topology of claim 5, wherein the first directional VRF forwarding table is configured to control traffic on the first single bi-directional communications link and on the second single bi-directional communication link.

7. The hub and spoke VPN topology of claim 3, further comprising a second CE network element configured to interface with the first hub PE network element over a second single bi-directional communication link.

8. The hub and spoke VPN topology of claim 7, wherein the first directional VRF forwarding table is configured to control traffic on the first single bi-directional communications link and on the second single bi-directional communication link.

9. The hub and spoke VPN topology of claim 3, further comprising a second hub, and wherein the first CE network element is configured to interface with the second hub over a second single bi-directional communication link.

10. The hub and spoke VPN topology of claim 9, further comprising a second directional VRF forwarding table associated with the second hub PE network element and configured to control traffic on the second single bi-directional communication link.

11. The hub and spoke VPN topology of claim 10, wherein the first VRF forwarding table contains first routing information and the second VRF forwarding table contains second routing information, the first routing information being functionally identical to the second routing information.

12. The hub and spoke VPN topology of claim 3, further comprising a second hub PE network element and a second CE network element, said second CE network element being configured to interface with the second hub PE network element over a second single bi-directional communication link.

13. The hub and spoke VPN topology of claim 12, further comprising a second directional VRF forwarding table associated with the second hub PE network element and configured to control traffic on the second single bi-directional communication link.

14. The hub and spoke VPN topology of claim 13, wherein the first VRF forwarding table contains first routing information and the second VRF forwarding table contains second routing information, said first routing information being functionally identical to the second routing information.

15. The hub and spoke VPN topology of claim 1, wherein the first hub PE network element is a hub reflector and wherein the first VRF forwarding table contains routing information sufficient to enable the hub reflector to reflect authorized traffic between the spokes, as directed by the attached CE network element.

16. A method of exchanging routing information in a BGP/MPLS-base hub-and-spoke topology Virtual Private Network (VPN), the method comprising the steps of:
   importing, by a directional VPN Routing and Forwarding (VRF) table associated with a first hub Provider Edge (PE) network element, first route information associated with a first route learned from a first VPN spoke in the hub-and-spoke VPN, said first route information being associated with a route from the first hub PE network element to the first spoke;
   passing the first route information to an attached VPN hub Customer Edge (CE) network element to be evaluated; and
   importing, by the directional VRF, second route information associated with the route if authorized by the VPN hub CE network element, said second route information being associated with a route from at least a second spoke to the first spoke via the first hub PE network element.

17. The method of claim 16, wherein the first route information is for a route from the first hub PE network element to the first VPN spoke, and wherein the second route information is for a route from at least a second of the VPN spokes to the first VPN spokes, said second route information being different than the first route information.

18. The method of claim 16, wherein the CE network element is connected to the PE network element by a single communication link that is used to communicate from the CE network element to the PE network element, and from the PE network element to the CE network element.

19. A hub Provider Edge (PE) network element, comprising:
   control logic containing a directional Virtual Private Network (VPN) Routing and Forwarding (VRF) table for use in directing traffic in a BGP/MPLS-based hub-and-spoke VPN network topology, said directional VRF table containing first route information for use in connection with packets arriving from an attached hub Customer Edge (CE) network element and second route information for use in connection with packets arriving over a backbone network from the spokes.

20. The hub network element of claim 19, wherein the control logic is further configured to reflect traffic received from one of the spokes in the VPN network onto another of the spokes in the VPN network according to the directional VRF table.

* * * * *

UNITED STATES PATENT AND TRADEMARK OFFICE
CERTIFICATE OF CORRECTION

PATENT NO. : 7,075,933 B2 Page 1 of 1
APPLICATION NO. : 10/746472
DATED : July 11, 2006
INVENTOR(S) : Can Aysan It is certified that error appears in the above-identified patent and that said Letters Patent is hereby corrected as shown below:

Change Claim 9 from

9. The hub and spoke VPN topology of claim 3, further comprising a second hub, and wherein the first CE network element is configured to interface with the second hub over a second single bi-directional communication link.

to:

9. The hub and spoke VPN topology of claim 3, further comprising a second hub PE network element, and wherein the first CE network element is configured to interface with the second hub PE network element over a second single bi-directional communication link.

Signed and Sealed this

Twenty-sixth Day of December, 2006

JON W. DUDAS
*Director of the United States Patent and Trademark Office*